(12) United States Patent
Robins

(10) Patent No.: US 8,499,050 B2
(45) Date of Patent: Jul. 30, 2013

(54) METHOD, APPARATUS, AND SYSTEM FOR AUTOMATICALLY REPLYING TO MAIL

(75) Inventor: George Robins, Bangalore (IN)

(73) Assignee: Huawei Technologies Co., Ltd., Shenzhen (CN)

( * ) Notice: Subject to any disclaimer, the term of this patent is extended or adjusted under 35 U.S.C. 154(b) by 102 days.

(21) Appl. No.: 13/170,749

(22) Filed: Jun. 28, 2011

(65) Prior Publication Data

US 2011/0258276 A1    Oct. 20, 2011

Related U.S. Application Data

(63) Continuation of application No. PCT/CN2009/076220, filed on Dec. 30, 2009.

(30) Foreign Application Priority Data

Dec. 31, 2008  (CN) .......................... 2008 1 0187996

(51) Int. Cl.
    *G06F 15/16* (2006.01)
(52) U.S. Cl.
    USPC ............................ 709/206; 709/224; 709/225
(58) Field of Classification Search
    USPC .......................................... 709/206, 224, 225
    See application file for complete search history.

(56) References Cited

U.S. PATENT DOCUMENTS

| | | | |
|---|---|---|---|
| 2002/0091777 A1* | 7/2002 | Schwartz | 709/206 |
| 2004/0249894 A1 | 12/2004 | Nishimura | |
| 2005/0027569 A1 | 2/2005 | Gollogly et al. | |
| 2007/0011619 A1 | 1/2007 | Chang et al. | |
| 2007/0038942 A1 | 2/2007 | Chen et al. | |
| 2007/0135100 A1 | 6/2007 | Wang | |
| 2007/0201634 A1* | 8/2007 | Bonnaud et al. | 379/88.13 |
| 2008/0263158 A1* | 10/2008 | del Cacho et al. | 709/206 |
| 2008/0317223 A1* | 12/2008 | Koch | 379/88.21 |

FOREIGN PATENT DOCUMENTS

| | | |
|---|---|---|
| CN | 1530868 A | 9/2004 |
| CN | 1741551 A | 3/2006 |
| CN | 101018210 A | 8/2007 |
| CN | 101179619 A | 5/2008 |
| CN | 101217505 A | 7/2008 |
| JP | 2001337899 | 12/2001 |
| WO | WO 2010/075779 A1 | 7/2010 |

OTHER PUBLICATIONS

English translation of First Chinese Office Action of Chinese Application No. 200810187996.6, mailed Dec. 7, 2011.
Written Opinion of the International Searching Authority mailed on Apr. 8, 2010 regarding International Application No. PCT/CN2009/076220, filed Dec. 30, 2009, 4 pages.

(Continued)

*Primary Examiner* — Nicholas Taylor
(74) *Attorney, Agent, or Firm* — Conley Rose, P.C.; Grant Rudolph; Nicholas K. Beaulieu

(57) ABSTRACT

A method, an apparatus, and a system for automatically replying a mail are provided. The method includes: receiving a new mail sent to a user; obtaining presence information of the user; searching for a mail automatic reply message corresponding to the presence information of the user; and sending the corresponding mail automatic reply message to a sender of the mail. Through the method, the apparatus, and the system, the presence information of the user is obtained, and automatic reply messages are respectively set for different presence information, so that the automatic reply messages are associated with the presence information of the user, and when a state of the user changes, the automatic reply messages are not required to be reset, thereby providing convenience for the user.

11 Claims, 6 Drawing Sheets

OTHER PUBLICATIONS

T. Showalter, "Sieve Email Filtering: Vacation Extension," Network Working Group, rfc5230, Sun Microsystems, Jan. 2008, 15 pages.

P. Guenther, "Sieve: An Email Filtering Language," Network Working Group, rfc5228, Sendmail, Inc., Jan. 2008, 38 pages.

* cited by examiner

METHOD, APPARATUS, AND SYSTEM FOR AUTOMATICALLY REPLYING TO MAIL

CROSS-REFERENCE TO RELATED APPLICATIONS

This application is a continuation of International Application No. PCT/CN2009/076220, filed on Dec. 30, 2009, which claims priority to Chinese Patent Application No. 200810187996.6, filed on Dec. 31, 2008, both of which are hereby incorporated by reference in their entireties.

FIELD OF THE INVENTION

The present invention relates to the field of mail processing, and in particular, to a method and an apparatus for automatically replying a mail.

BACKGROUND OF THE INVENTION

With the increasingly extensive use of the mail, the mail exerts a growing important effect in the work and the life of people. However, more and more mails, such as junk mails or advertisement mails bring processing burden for people.

Therefore, a Sieve mail filtering language is developed, and specific operations may be performed on a mail meeting specific conditions of a user by using the language, such as, deleting the mail, moving the mail to a specific mailbox, or forwarding the mail to another address. The operations may be implemented through a mail client or a mail server. Such mechanism reduces the mail processing burden for the user, and when the mail receiver cannot respond to the received mail in time, the mails meeting the specific conditions are automatically replied.

SUMMARY OF THE INVENTION

Accordingly, embodiments of the present invention provide a method, an apparatus, and a system for automatically replying a mail.

An embodiment of the present invention provides a method for automatically replying a mail, where the method includes: receiving a new mail sent to a user; obtaining presence information of the user; searching for a mail automatic reply message corresponding to the presence information of the user; and sending the corresponding mail automatic reply message to the sender of the mail.

An embodiment of the present invention further provides an apparatus for automatically replying a mail, where the apparatus includes: a mail receiving unit, configured to receive a new mail sent to a user; a presence information obtaining unit, configured to obtain presence information of the user; an automatic reply message matching unit, configured to search a mail automatic reply message corresponding to the presence information of the user; and an automatic reply message sending unit, configured to send the corresponding mail automatic reply message to the sender of the mail.

Through the method, the apparatus, and the system for automatically replying a mail of the present invention, the presence information of the user is obtained, and the automatic reply messages are set respectively for different presence information, so that the automatic reply messages are associated with the presence information of the user, and when a state of the user changes, the automatic reply messages are not required to be reset, thereby providing convenience for the user.

DETAILED DESCRIPTION OF THE EMBODIMENTS

The embodiments of the present invention are described in detail in the following with reference to the accompanying drawings.

Figure 1:
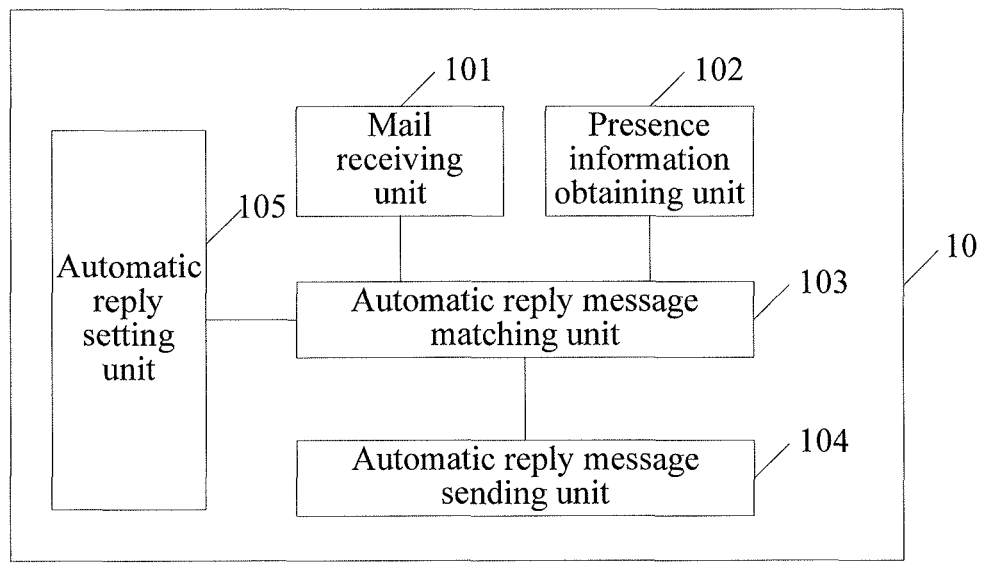
FIG. 1 is a schematic structural diagram of an apparatus for automatically replying a mail according to an embodiment of the present invention.

FIG. 1 is an elementary diagram of an apparatus 10 for automatically replying a mail according to an embodiment of the present invention. As shown in FIG. 1, the apparatus 10 for automatically replying a mail includes: a mail receiving unit 101, configured to receive a new mail sent to a user; a presence information obtaining unit 102, configured to obtain presence information of the user; an automatic reply message matching unit 103, configured to search for a mail automatic reply message corresponding to the presence information of the user; and an automatic reply message sending unit 104, configured to send the corresponding mail automatic reply message to a sender of the mail.

Optionally, the apparatus 10 for automatically replying a mail in FIG. 1 further includes: an automatic reply setting unit 105, configured to set mail automatic reply messages respectively for different presence information of the user. The automatic reply setting unit 105 in FIG. 1 is further configured to set a mail automatic reply time interval, and in consideration of frequent changes of the presence information, a time unit of the time interval may be hour, minute, or even second. The automatic reply message sending unit 104 is further configured to send the mail automatic reply message corresponding to the presence information of the user to the sender of the mail according to the mail automatic reply time interval.

In an optional implementation manner, the automatic reply setting unit 105 is further configured to set the mail automatic reply messages for different mail information key words; the automatic reply matching unit 103 is further configured to search for mail automatic reply messages corresponding to the presence information of the user and search for mail automatic reply messages corresponding to the mail information key words; and the automatic reply message sending unit 104 is further configured to send the mail automatic reply message, which satisfies both the presence information and the mail information key words, to the sender of the mail.

The presence information obtaining unit 102 is configured to obtain the presence information of the user from a mail server or an external presence information server. In this embodiment of the present invention, the presence information obtaining unit 102 may obtain the presence information of the user through the following two manners: When a new mail is received, the presence information obtaining unit 102 requests the presence information of the user from the mail server or the external presence information server; or the presence information obtaining unit 102 subscribes to the presence information of the user to the mail server or the external presence information server, and when the presence information of the user changes, the presence information obtaining unit 102 receives the presence information automatically delivered by the mail server or the external presence information server.

Figure 2:
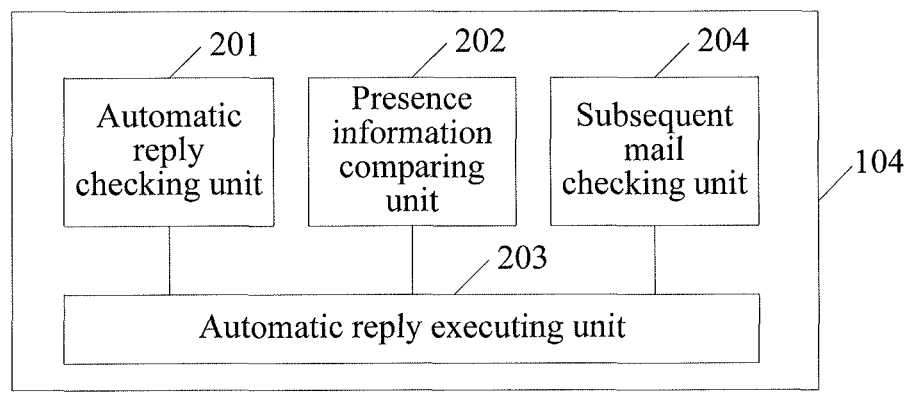
FIG. 2 is a schematic structural diagram of an automatic reply message sending unit according to an embodiment of the present invention.

FIG. 2 is a detailed elementary diagram of the automatic reply message sending unit 104 according to an embodiment of the present invention. As shown in FIG. 2, the automatic reply message sending unit 104 includes: an automatic reply checking unit 201, configured to determine whether an automatic reply is sent to the sender of the mail during the mail automatic reply time interval before the new mail reaches; a presence information comparing unit 202, configured to compare the current presence information of the user with the presence information during previous automatic reply; and an automatic reply executing unit 203, configured to send the mail automatic reply message corresponding to the presence information of the user to the sender of the mail at once if the automatic reply is not performed during the mail automatic reply time interval before a new mail reaches, send the mail automatic reply message corresponding to the presence information of the user to the sender of the user at once if the automatic reply is performed, but the presence information changes, and send the mail automatic reply message corresponding to the presence information of the user to the sender of the mail when the mail automatic reply time interval is reached after the previous automatic reply if the automatic reply is performed and the presence information does not change.

Optionally, the automatic reply message sending unit 104 further includes: a subsequent mail checking unit 204, configured to determine whether a subsequent mail from the same sender of the mail is received after the new mail is received and before the automatic reply time of the new mail is reached; the presence information comparing unit 202 is further configured to determine whether the presence information of the user changes when the subsequent mail is received; and the automatic reply executing unit 203 is further configured to automatically reply the subsequent mail and not automatically reply the new mail if the presence information changes when the subsequent mail is received, and automatically reply the new mail when the automatic reply time of the new mail is reached if the presence information does not change.

Optionally, the automatic reply message sending unit 104 in the embodiment of the present invention is further configured to determine whether the current presence information of the user is "online" before sending the mail automatic reply message, and stop sending the mail automatic reply message to the sender of the mail if the user is on line, the reason is that the user may conveniently reply the mail if the user is online, and the automatic reply function is not required during this period.

An operation principle of the apparatus 10 for automatically replying a mail according to the embodiment of the present invention is described in detail in the following with reference to examples. In the following description and accompanying drawings, m indicates the received mail, in which m1, m2 . . . distinguish different mails by using serial numbers; r indicates the automatic reply message, in which r1, r2 . . . distinguish different mail automatic reply messages by using serial numbers; and p indicates the presence information of the user (receiver of the mail), in which p1, p2 . . . distinguish different presence information values by using serial numbers. In this embodiment, the mail automatic reply time interval is set to two hours.

Figure 2A:
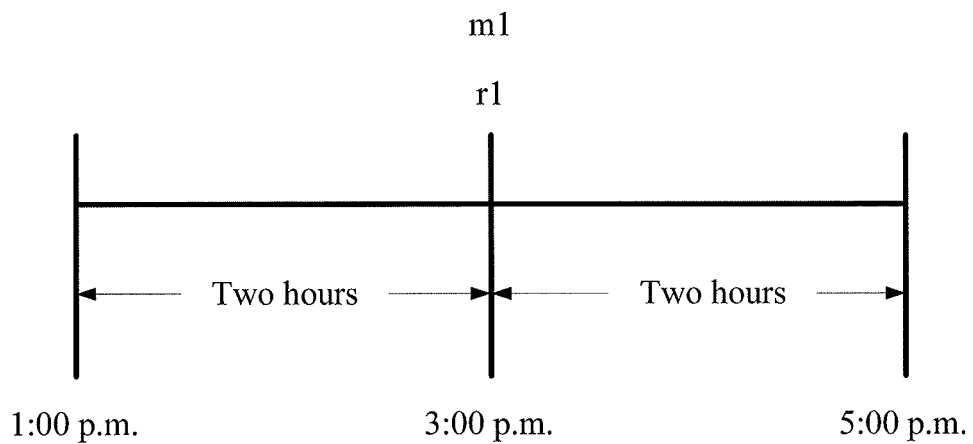
FIG. 2a is a schematic diagram 1 of automatically replying a mail according to an embodiment of the present invention.

FIG. 2a is a schematic diagram 1 of automatically replying a mail according to an embodiment of the present invention. As shown in FIG. 2a, assuming that the apparatus 10 for automatically replying a mail receives a new mail m1 from a sender A at 3:00 p.m., before sending the automatic reply message, the apparatus 10 for automatically replying a mail may determine whether the automatic reply message is sent to A in two hours ago, and if the automatic reply message is not sent to A in two hours ago, the apparatus 10 for automatically replying a mail automatically replies the mail at once, that is, sends the automatic reply message r1; if the automatic reply message is sent to A in two hours ago, the apparatus 10 for automatically replying a mail performs the determination of the second condition.

Figure 2B:
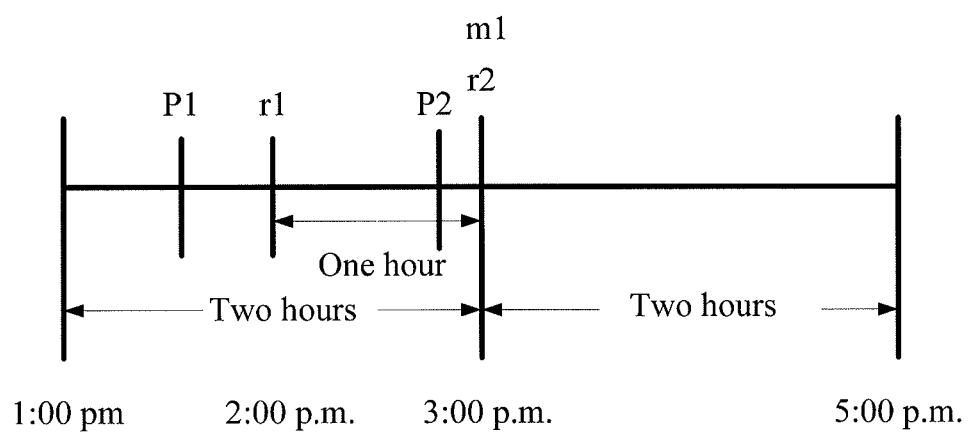
FIG. 2b is a schematic diagram 2 of automatically replying a mail according to an embodiment of the present invention.

FIG. 2b is a schematic diagram 2 of automatically replying a mail according to an embodiment of the present invention. As shown in FIG. 2b, if the apparatus 10 for automatically replying a mail sends the automatic reply message r1 to A at 2:00 p.m., the apparatus 10 for automatically replying a mail further determines whether the presence state of the user changes between 2:00 p.m. and 3:00 p.m. In FIG. 2b, the presence state of the user is p2 at 3:00 p.m., while the presence state of the user is p1 at 2:00 p.m., and thus the apparatus 10 for automatically replying a mail (a mail client or a mail server) may send the automatic reply message r2 to A at once due to the change. If the presence information does not change, the apparatus 10 for automatically replying a mail performs the determination of the third condition.

Figure 2C:
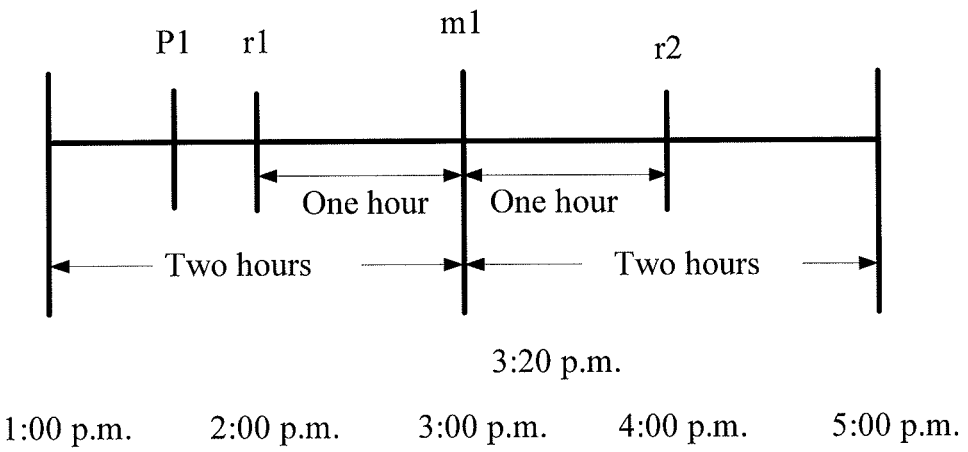
FIG. 2c is a schematic diagram 3 of automatically replying a mail according to an embodiment of the present invention.

FIG. 2c is a schematic diagram 3 of automatically replying a mail according to an embodiment of the present invention. As shown in FIG. 2c, since the presence information does not change, the sending of the automatic reply may delay, that is, the automatic reply is performed two hours (that is, 4:00 p.m.) after the previous automatic reply time (2:00 p.m.). Further, in the third condition, two special conditions need to be explained.

Figure 2D:
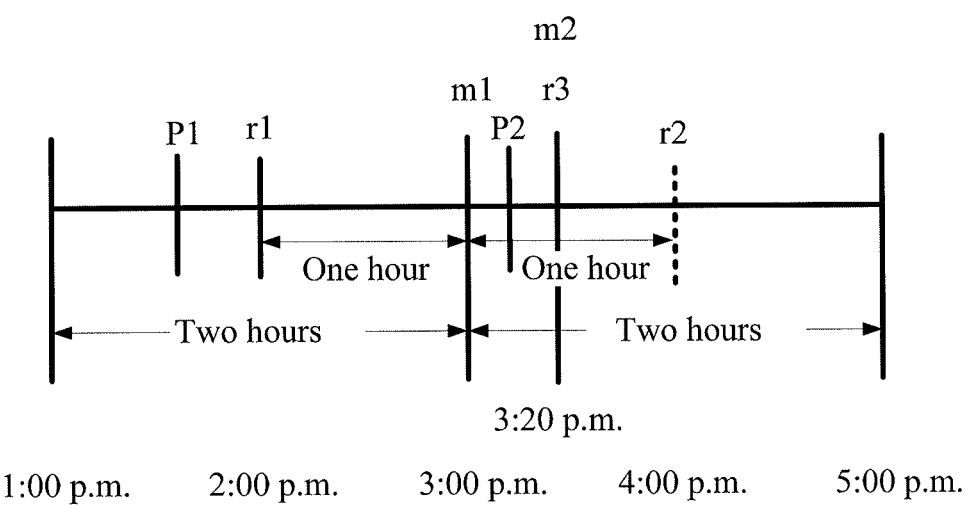
FIG. 2d is a schematic diagram 4 of automatically replying a mail according to an embodiment of the present invention.

FIG. 2d is a schematic diagram 4 of automatically replying a mail according to an embodiment of the present invention. As shown in FIG. 2d, assuming that A sends a subsequent mail m2 at 3:20 p.m., because the presence information changes at this time, the presence state of the user changes from P1 to P2, which is different from the presence information during the previous reply. At this time, the apparatus 10 for automatically replying a mail sends an automatic reply r3 to A at once, and the delay reply supposed to be sent to m1 at 4:00 p.m. does not need to be sent (dotted line indicates that r2 does not need to be sent), that is, r3 is a reply to m1 and m2.

Figure 2E:
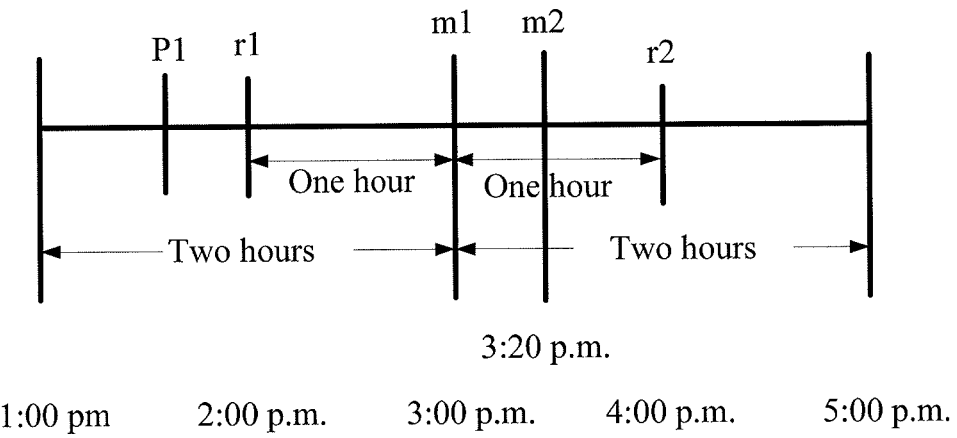
FIG. 2e is a schematic diagram 5 of automatically replying a mail according to an embodiment of the present invention.

FIG. 2e is a schematic diagram 5 of automatically replying a mail according to an embodiment of the present invention.

As shown in FIG. 2e, if A sends a plurality of subsequent mails, such as m2, before the delay reply r2 to m1 and the presence information of the user does not change all along between the m1 and the r2, no matter how many mails A sends during the period, r2 is merely replied finally, and the delay reply is not performed for each mail (actually, the time of the delay reply is 4:00 p.m.).

In the embodiment of the present invention, the mail automatic reply based on the current presence information of the mail receiver is implemented by extending a Sieve mail filtering language. In order to implement the condition determination based on the presence information of the user, shorten the reply interval of the automatic reply message, and enable the sender of the mail to receive a faster response, the Sieve mail filtering language is extended in the embodiment of the present invention.

A series of Action commands are defined in the current Sieve mail filtering language, in which, Action indicates the operation on the mails, such as "fileinto" and "redirect" which respectively indicate saving the mail to a certain mailbox, and forwarding the mail to another address. A series of Test commands are defined in the Sieve mail filtering language, in which, Test is used to determine which part of the condition needs to be executed; for example, "allof", "header", and "not" respectively indicate logic AND of the condition, a mail header, and not meeting a certain condition.

Vacation is an extension to the Sieve mail filtering language, and is a new mail operation, which is used to automatically reply the mail meeting the specific conditions when the mail receiver cannot respond to the received mail in time; that is, the pre-defined automatic reply message is sent to the sender of the mail. The user may provide the information such as the state and the contact information in the set automatic reply message, so that the sender of the mail knows the related state information of the user.

An example of an extended Sieve script by using the vacation is as follows:

```
require "vacation";
vacation: days 7
"Sorry, I'm away, I'll read your message when I get around to it.";
```

The Sieve script indicates that the mail automatic reply time interval is 7 days. Once the mail server receives a new mail, the mail server determines whether the automatic reply has been sent to the sender of the mail in the previous 7 days, and if the automatic reply has not been sent to the sender of the mail in the previous 7 days, the mail server sends the automatic reply message "Sorry, I'm away, I'll read your message when I get around to it." to the sender of the mail at once; if the automatic reply has been sent to the sender of the mail in the previous 7 days, the mail server automatically replies the mail 7 days after the previous reply, that is, the frequency of the automatic reply to the sender of the mail is not more than once a week. The parameter "days" indicates the time interval between the automatic reply messages, and is configured to limit the frequency of the automatic reply.

In the embodiment of the present invention, the Sieve is further extended, which includes the following cases.

(1) The operation indicating the automatic reply is extended, and the specific extending method is as follows:

Autoreply indicating the automatic reply is added in the Action commands in the Sieve mail filtering language, and the reply interval of the autoreply operation is in a time unit such as hour, minute or a smaller time unit. In this embodiment of the present invention, a parameter "time" indicating the reply time interval is set for the autoreply operation. Definitely, the related parameters of the autoreply operation are not limited hereto, and more parameters may be set according to the actual requirements.

An example of the Sieve script by using the autoreply operation is as follows:

```
require "autoreply";
autoreply : time 30 : unit minute
"Sorry, I'm away, I'll read your message when I get around to it.";
```

In the Sieve script, granularity of the reply time interval is set to be 30 minutes, in which, "unit" indicates the time unit, such as hour, minute, and second.

(2) The field indicating the presence information is extended, and the specific extending method is as follows:

Presence authentication, which indicates the presence information, is added in the Test commands in the Sieve mail filtering language and the value of presence authentication varies with the source of the presence information obtained by the mail server or the mail client. For example, some instant communication systems merely provide very basic presence information of the user, such as online or not, or a busy/idle condition, while some services can provide very abundant presence information of the user; for example, the presence service can provide the presence information including the location, activity or equipment state of the user.

An example of the Sieve script by using the presence authentication is as follows:

```
require ["autoreply" , "presence"];
if presence : is "away"{
autoreply "Sorry, I'm away, I'll read your message when I get around to it.";
}
```

The Sieve script indicates that if the presence information of the user is "away", when a new mail is received, the automatic reply message "Sorry, I'm away, I'll read your message when I get around to it." is sent to the sender of the mail. Further, the process of determining whether the automatic reply message is sent at once before sending the automatic reply message is as shown in FIGS. 2a to 2e, which is not described in detail herein again.

Figure 3:
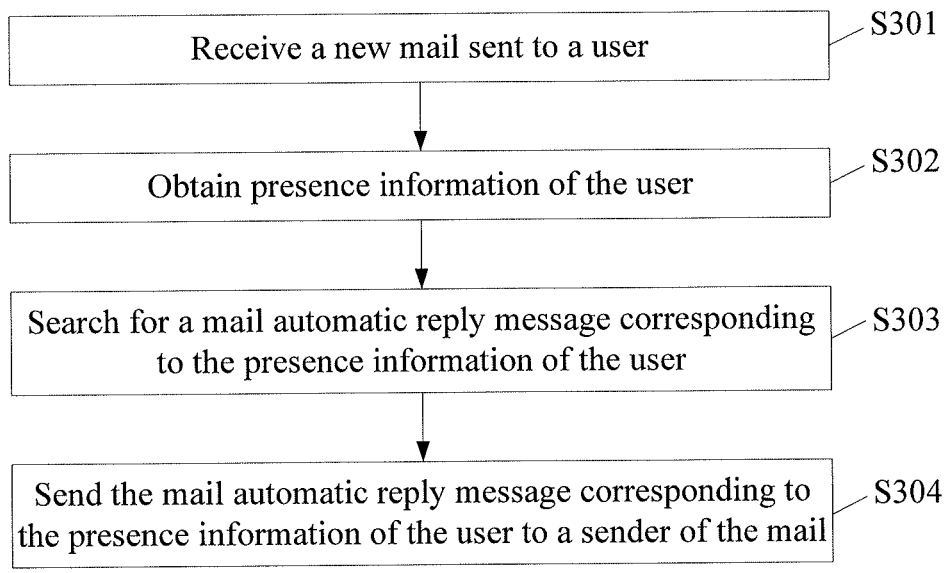
FIG. 3 is a flow chart of a method for automatically replying a mail by an apparatus for automatically replying a mail.

FIG. 3 is an overall flow chart of automatically replying a mail by an apparatus 10 for automatically replying a mail. As shown in FIG. 3, The flow includes the following steps:

Step S301: Receive a new mail sent to a user.

Step S302: Obtain presence information of the user.

Step S303: Search for a mail automatic reply message corresponding to the presence information of the user.

Step S304: Send the mail automatic reply message corresponding to the presence information of the user to a sender of the mail.

Figure 4:
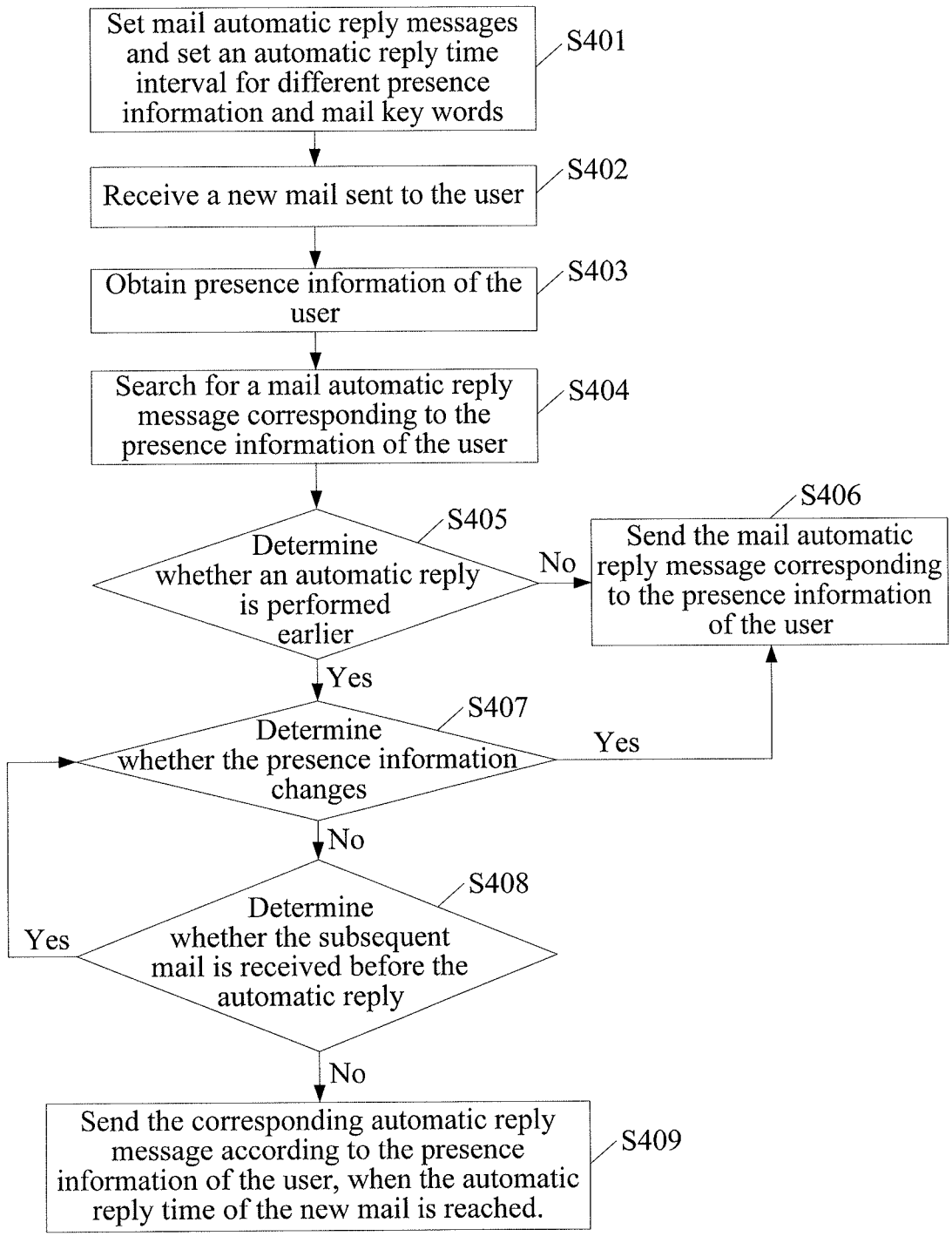
FIG. 4 is a detailed flow chart of a method for automatically replying a mail by an apparatus for automatically replying a mail.

FIG. 4 is a detailed flow chart of automatically replying a mail by an apparatus 10 for automatically replying a mail. As shown in FIG. 4, the flow includes the following steps:

Step S401: Set automatic reply messages respectively for different presence information of the user.

That is, different automatic reply messages sent to the sender of the mail under different conditions are set, and the conditions not only include the conditions based on the mail itself in the prior art, but also include the conditions of the presence information of the user. When the conditions are met, a mail client or a mail server of the receiver sends the corresponding automatic reply message to the sender of the mail, the automatic reply message is defined by the mail user, and different automatic reply messages may be set for different senders of the mail.

Optionally, step S401 further includes: setting a mail automatic reply time interval, where a time unit of the mail automatic reply time interval is hour, minute, or second. In addition, this step may also include: setting mail automatic reply messages for different mail information key words.

Step S402: Receive a new mail sent to a user.

Step S403: Obtain presence information of the user.

The presence information of the user may be obtained from the mail server or an external presence information server, in which the mail server in this embodiment generally refers to a system capable of providing mail services, and the presence information server generally refers to a data source capable of providing the presence information, such as an instant message system for integrating the presence information. The presence information of the user may be obtained in the following two manners: One is that, when the new mail is received, a request of obtaining the presence information of the user is sent to the mail server or the external information server. The other one is that, the presence information of the user is subscribed to from the mail server or the external information server, and when the presence information of the user changes, the presence information automatically delivered by the mail server or the external information server is received.

If the service provider providing the mail service further provides services related to the presence information, that is, the service system has the presence information of the user, condition determination may be directly performed according to the presence information of the user existing in the system. On the contrary, if the service provider providing the mail service does not provide the services related to the presence information, that is, the service system does not have the presence information of the user, the presence information needs to be obtained from the external information source capable of providing the presence information of the user, such as the presence information server, the instant message system integrating the presence information or websites capable of providing the online information of the user.

Since the user may use different types of identities in a mail system and in an external system, the mail system requires that the user provides his/her identity in the external system in such case, so that the mail system obtains the presence information of the user from the external system. Specifically, the user may provide his/her identity in the external system to the mail system in many manners, for example, the identity is provided in mail system initiation register information or in the setting of the automatic reply function. Multiple information resources can provide the presence information of the user, and herein, the presence service formulated in the Internet Engineering Task Force (IETF) is taken as an example to describe the interaction process of obtaining the presence information of the user from the presence information server by the mail system.

A Session Initial Protocol (SIP) SUBSCRIBE/NOTIFY mechanism is used for the interaction between the mail system and the presence information server. Specifically, the mail server or the mail client initiates a SIP SUBSCRIBE request to obtain the presence information of the user, and the SIP SUBSCRIBE message is as follows:

```
SUBSCRIBE sip:user@example.com SIP/2.0
Via: SIP/2.0/TCP mailserver.example.com;branch=z9hG4bKnashds7
To: <sip:user@example.com>
From: <sip:mailserver.example.com>;tag=xfg9
Call-ID: 2010@mailserver.example.com
CSeq: 17766 SUBSCRIBE
Max-Forwards: 70
Event: presence
Accept: application/pidf+xml
Contact: <sip:mailserver.example.com>
Expires: 0
Content-Length: 0
[filter......].
```

A filtering condition may be carried in the message body to implement the obtaining of the required presence information.

The presence information server returns the presence information of the user to the mail server or the mail client through a SIP NOTIFY message, and the message is shown as follows:

```
NOTIFY sip:mailserver@example.com SIP/2.0
Via: SIP/2.0/TCP server.example.com; branch=z9hG4bKna998sk
From: <sip:server.example.com>;tag=ffd2
To: <sip:mailserver@example.com>;tag=xfg9
Call-ID: 2010@mailserver.example.com
Event: presence
Subscription-State: active; expires=0
Max-Forwards: 70
CSeq: 8775 NOTIFY
Contact: sip:server.example.com
Content-Type: application/pidf+xml
Content-Length: ...
[PIDF Document].
```

The presence information of the user is indicated in Presence Information Data Format (PIDF) in the message body.

Step S404: Search for a mail automatic reply message corresponding to the presence information of the user.

The step specifically includes: The presence information of the user is matched with the mail automatic reply message, and further, if the automatic reply rule also includes the conditions based on the mail information, the condition matching needs to be performed according to the mail information, and the mail automatic reply message is sent in combination with the condition matching of the presence information.

Step S405: Determine whether an automatic reply is sent to the sender of the new mail during the mail automatic reply time interval before the new mail is received, and if the automatic reply is performed, step S406 is performed; if the automatic reply is not performed, step S407 is performed.

Step S406: Send the mail automatic reply message corresponding to the presence information of the user to a sender of the mail.

Step S407: Determine whether current presence information of the user changes in comparison with the presence information during the previous automatic reply, and if the current presence information changes, step S406 is performed; if the current presence information does not change, step S408 is performed.

Step S408: Determine whether a subsequent mail from the same sender of the mail is received after the new mail is received and before the automatic reply time of the new mail is reached, and if the subsequent mail is received, step S407 is performed to determine whether the current presence information of the user changes in comparison with the presence information during the previous automatic reply; if the presence information changes, step S406 is performed at once to perform the mail automatic reply; if the presence information does not change, the reaching of the subsequent mail is continuously detected; and if no subsequent mail reaches or the presence information of the user does not change when the subsequent mail reaches, step S409 is performed.

Step S409: When the automatic reply time of the new mail is reached, the corresponding automatic reply message is sent according to the presence information of the user.

Optionally, in the flow charts of FIGS. 3 and 4, the flow further includes: Before sending the mail automatic reply message, determine whether the presence information of the user is "online", and if the user is online, the automatic reply message should not be sent to the sender of the mail, the reason is that the user may conveniently reply the mail when the user is online and the automatic reply function is not required during the period.

Figure 5:
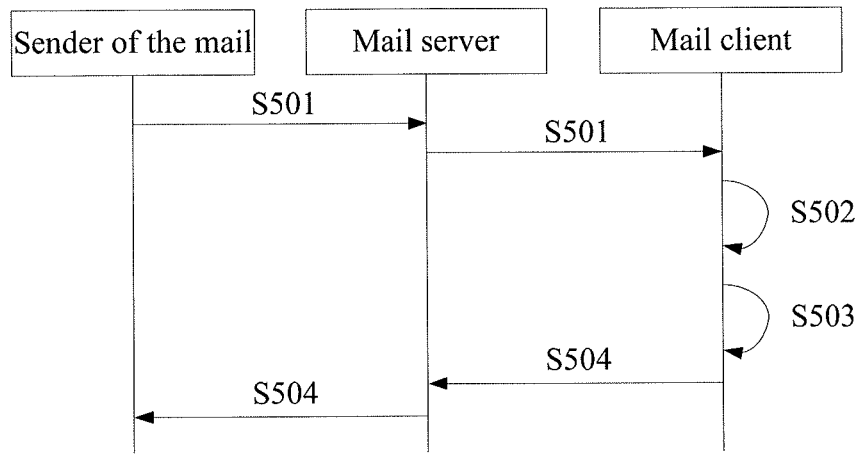
FIG. 5 is a signaling flow chart 1 of a system for automatically replying a mail according to an embodiment of the present invention.

FIG. 5 is a signaling flow chart 1 of a system for automatically replying a mail according to an embodiment of the present invention. A mail client of the system is configured to set automatic reply messages respectively for different presence information of the user, receive a new mail sent to the user, obtain the presence information of the user, search for a mail automatic reply message corresponding to the presence information of the user, and send the corresponding mail automatic reply message to a sender of the mail. The mail client in FIG. 5 stores the rules of the mail automatic reply, and the signaling process in FIG. 5 is described in detail in the following:

Step S501: The mail client receives a new mail sent to a user through a mail server.

Step S502: The mail client obtains presence information of the user.

Step S503: The mail client obtains a matched automatic reply message corresponding to the presence information.

Step S504: The mail client sends the corresponding mail automatic reply message to the sender of the mail through the mail server.

Figure 6:
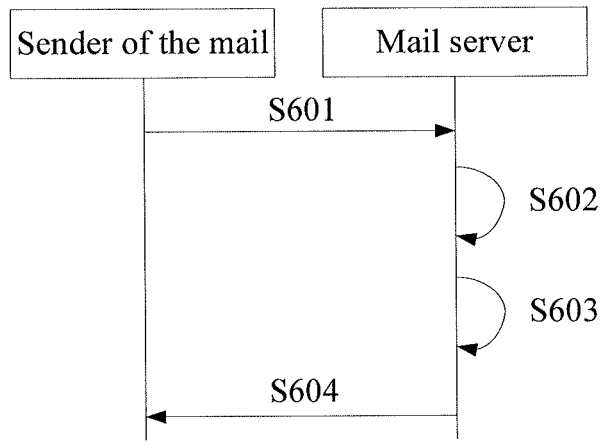
FIG. 6 is a signaling flow chart 2 of a system for automatically replying a mail according to an embodiment of the present invention.

FIG. 6 is a signaling flow chart 2 of a system for automatically replying a mail according to an embodiment of the present invention. A mail server of the system is configured to set automatic reply messages respectively for different presence information of a user, receive a new mail sent to the user, obtain the presence information of the user, search for the mail automatic reply message corresponding to the presence information of the user, and send the corresponding mail automatic reply message to a sender of the mail. The mail server in FIG. 6 stores the rules of the mail automatic reply, and the signaling process in FIG. 6 is described in detail in the following:

Step S601: The mail server receives the new mail sent to the user.

Step S602: The mail server obtains the presence information of the user.

Step S603: The mail client matches the automatic reply messages corresponding to the presence information.

Step S604: The mail server sends the corresponding mail automatic reply message to the sender of the mail.

Figure 7:
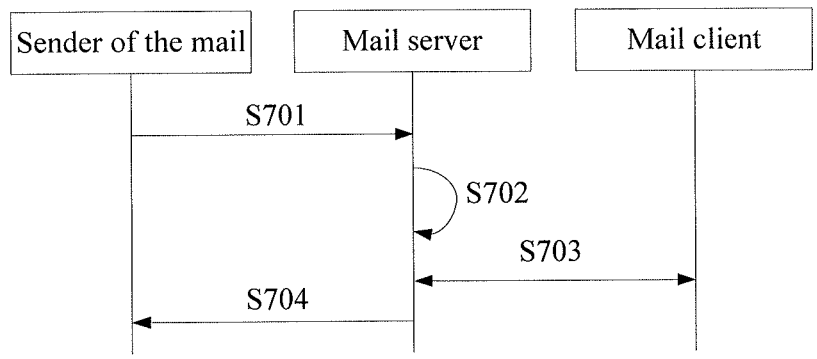
FIG. 7 is a signaling flow chart 3 of a system for automatically replying a mail according to an embodiment of the present invention.

FIG. 7 is a signaling flow chart 3 of a system for automatically replying a mail according to an embodiment of the present invention. The mail client of the system is configured to set automatic reply messages respectively for different presence information of a user. The mail server of the system is configured to receive a new mail sent to the user; obtain presence information of the user; search for the mail automatic reply message corresponding to the presence information of the user according to the setting of the mail client; and send the corresponding mail automatic reply message to a sender of the mail. The system in FIG. 7 saves the automatic reply rules in the client, and the server judges conditions and sends the automatic reply messages. The signaling process in FIG. 7 is described in detail in the following:

Step S701: The mail server receives the new mail sent to the user.

Step S702: The mail server obtains the presence information of the user.

Step S703: The mail server obtains the related rules of the automatic reply from the mail client, searches for the automatic reply message corresponding to the presence information, or the mail server directly searches for the related rules of the automatic reply from the mail client.

Step S704: The mail server sends the corresponding mail automatic reply message to the sender of the mail.

The implementation of the embodiments of the present invention is described in detail in the following with reference to different examples. In the following embodiments, the consideration to a reply time interval, that is, restriction to automatic reply frequency is omitted, and as for the specific processing, reference is made to the foregoing description.

Embodiment 1

A mail user hopes that when he/she cannot reply a mail from a customer in time when he/she is busy, the mail server sends the automatic reply message to the customer, so as to explain that the user is busy and may reply later. Specifically, a corresponding Sieve script of the automatic reply rules based on the presence information of the user in this embodiment is as follows:

```
require ["autoreply", "presence"]
if allof (header : contains "from" "customer@example.com",
presence : is "busy")
{
autoreply "Sorry , I have to deal with something now, and I'll
get back to you once I've
done !!!";
}
```

The Sieve script indicates that, if the received mail is from customer@example.com and the presence information of the user is "busy", the automatic reply message "Sorry, I have to deal with something now, and I'll get back to you once I've done!!!" is sent to the sender of the mail, in which, "require" is the existing operation in a Sieve mail filtering language, and is configured to state which extension is used in the script. In this embodiment, the autoreply action and the presence test extended in the present invention are used.

The execution process of the Sieve script is:

Step 1: Determine whether a From header includes customer@example.com according to the received mail, and if the condition is met, step 2 is performed; if the condition is not met, the script is not continuously performed.

Step 2: Obtain the presence information of the user, and determine whether the user is in a busy state, and if the condition is met, step 3 is performed; if the condition is not met, the script is not continuously performed.

Step 3: Send the automatic reply message "Sorry, I have to deal with something now, and I'll get back to you once I've done!!!" to the sender of the mail.

Embodiment 2

A mail user hopes that when he/she is on a business trip, if a workmate sends a mail, the message is automatically replied to inform that the user is on a business trip and cannot deal with the mail, and work-related matters may be arranged by a secretary. Specifically, a corresponding Sieve script of the automatic reply rules based on the presence information of the user in this embodiment is as follows:

```
require ["autoreply","presence"]
    if allof (header : contains "from"
["workmate1@example.com",
"workmate2@example.com",......,workmate10@example.com]
    presence : is "on business trip")
    {
    autoreply "Sorry , I can not deal with your mail now, because I am
on a business trip,
and Ms. Feng will help you with your issues related to the project. ";
    }
    elsif header : matches "subject"
["*make*money*fast*", "*win*prize*", "*advertis*"]
    {
    discard;
    }
    else
    {
    keep;
    }
```

The Sieve script indicates that, when the presence information of the user shows that the user is on a business trip, if the workmates workmate1@example.com, workmate2@example.com . . . workmate10@example.com send mails, the automatic reply message "Sorry, I can not deal with your mail now, because I am on a business trip, and Ms. Feng will help you with your issues related to the project." is sent. In addition, if the subject of the received mail is as follows: "*make*money*fast*", "*win*prize*" or "*advertis*" (* indicates zero or more characters), the mails are rejected because the mails are probably junk mails, and if the received mails do not meet the conditions, the mails are saved in a default location.

The execution process of the Sieve script is:

Step 1: Determine whether a From header includes workmate1@example.com, workmate2@example.com, . . . or workmate10@example.com according to the received mail, and if the condition is met, step 2 is performed; if the condition is not met, step 4 is performed.

Step 2: Obtain the presence information of the user, and determine whether the user is "on business trip", and if the condition is met, step 3 is performed; if the condition is not met, step 4 is performed.

Step 3: Send the automatic reply message "Sorry, I can not deal with your mail now, because I am on a business trip, and Ms. Feng will help you with your issues related to the project." to the sender of the mail.

Step 4: Determine whether a Subject header of the mail is "*make*money*fast*", "win*prize*" or "*advertis*", and if the condition is met, the mail is rejected; if the condition is not met, step 5 is performed.

Step 5: Save the mail in the default location.

Embodiment 3

A mail user hopes that, when the presence information of the mail user has different values, different automatic reply messages are sent to a mail sender, and different automatic reply messages are returned to different senders. Specifically, a corresponding Sieve script of the automatic reply rules based on the presence information of the mail user in this embodiment is as follows:

```
require ["autoreply", "presence"]
if allof (header : contains "from"
["contact1@example.com","contact2@example.com",......,contact7@example.com]
    presence : is "away")
    {
    autoreply "I am away until next week. If it is an emergency, you can call XXXX.";
    }
    elsif allof (header : contains "from"
["contact1@example.com","contact2@example.com",......,contact7@example.com]
    presence : is "busy")
    {
    autoreply "Oh my god, I am so busy! I will respond to you later,
    wish you a happy day!";
    }
    elsif allof (NOT header : contains "from"
["contact1@example.com","contact2@example.com",......,contact7@example.com]
    presence : is "busy")
    {
    autoreply "I am busy now, and will respond to you later";
    }
    elsif allof (header : contains "from"
["contact1@example.com","contact2@example.com",......,contact7@example.com]
    presence : is "offline")
    {
    autoreply "Sorry, I am inconvenient to read your mail.";
    }
    else
    {
    keep;
    }
```

The Sieve script indicates that, when the sender of the mail is a specific contact person, contact1@example.com, contact2@example.com . . . or contact7@example.com, and the presence information of the user is "away", the automatic reply message "I am away until next week. If it is an emergency, you can call XXXX." is sent. If the sender of the mail is still the contact person, and the presence information of the user is "busy", the automatic reply message "Oh my god, I am so busy! I will respond to you later, wish you a happy day!" is sent. Likewise, as for the contact person, if the presence information of the user is "offline", the automatic reply message "Sorry, I am inconvenient to read your mail." is sent; if the sender of the mail is not any one of the contact persons, and the presence information of the user is "busy", the automatic reply message "I am busy now, and will respond to you later." is sent; and if the received mail does not meet the conditions, the mail is saved in a default location.

The execution process of the Sieve script is:

Step 1: Determine whether a From header includes contact1@example.com, contact2@example.com . . . or contact7@example.com according to the received mail, and if the From header includes required information, step 2 is performed; if the From header does not include required information, step 4 is performed.

Step 2: Obtain the presence information of the user, and determine whether the user is away, and if the condition is met, step 3 is performed; if the condition is not met, step 4 is performed.

Step 3: Send the automatic reply message "I am away until next week. If it is an emergency, you can call XXXX." to the sender of the mail. The execution of the script ends, and the following steps are not performed.

Step 4: Determine whether the From header includes contact1@example.com, contact2@example.com . . . or contact7@example.com, and if the From header includes required information, step 5 is performed; if the From header does not include required information, step 7 is performed.

Step 5: Determine whether the presence information of the user is "busy", and if the presence information of the user is "busy", step 6 is performed; if the presence information of the user is not "busy", step 7 is performed.

Further, if step 2 is performed, that is, the presence information of the user is obtained, the presence information of the user does not need to be obtained in this step; if step 2 is not performed, the presence information of the user needs to be first obtained in this step.

Step 6: Send the automatic reply message "Oh my god, I am so busy! I will respond to you later, wish you a happy day!". The execution of the script ends, and the following steps are not performed.

Step 7: Determine whether the From header includes contact1@example.com, contact2@example.com . . . or contact7@example.com, and if the From header includes required information, step 8 is performed; if the From header does not required information, step 10 is performed.

Step 8: Determine whether the presence information of the user is "busy", and if the presence information of the user is "busy", step 9 is performed; if the presence information of the user is not "busy", step 10 is performed.

Further, if the presence information of the user is obtained in the performed steps, the presence information of the user does not need to be obtained in this step; if the presence information of the user is not obtained in the performed steps, the presence information of the user needs to be first obtained in this step.

Step 9: Send the automatic reply message "I am busy now, and will respond to you later". The execution of the script ends, and the following steps are not performed.

Step 10: Determine whether the From header includes contact1@example.com, contact2@example.com . . . or contact7@example.com, and if the From header includes required information, step 11 is performed; if the From header does not include required information, step 13 is performed.

Step 11: Determine whether the presence information of the user is "away", and if the condition is met, step 12 is performed; if the condition is not met, step 13 is performed.

Step 12: Send the automatic reply message "Sorry, I am inconvenient to read your mail.". The execution of the script ends, and the following step is not performed.

Step 13: Save the received mail in the default location.

In the embodiments of the present invention, a new action command autoreply, which indicates the automatic reply, is extended for the Sieve mail filtering language and the reply time interval of the automatic reply is based on the granularity such as hour or minute, so that the sender of the mail may obtain a faster response.

Further, as mentioned earlier, the extended autoreply action is based on the reply time interval with small granularity in the present invention, and the presence information changes quickly, and therefore, the autoreply action is more suitable for implementing the automatic reply based on the presence information in comparison with the vacation in the prior art.

The Test command indicating the presence information is extended in the Sieve mail filtering language of the present invention, and such command may be used in the Sieve mail filtering mechanism and is not limited to the mail automatic reply implemented in the present invention, that is, the Test command may be used in other functions related to the mail filtering. The Test command is introduced to enrich the Sieve mail filtering language, and the presence information is combined with the mail filtering through the Test command, thereby implementing the mail filtering based in the state of the user, so that the mail filtering is more flexible.

Through the method for automatically replying the mail based on the presence information of the present invention, the user can set the automatic reply rules according to the state information thereof, that is, when the user is in different states, the mail server or the mail client sends the automatic reply message corresponding to the current state of the user to the sender of the mail according to the setting of the user, so that the automatic reply message does not need to be set again when the state of the user changes, thereby bringing convenience for the user. In addition, as for the sender of the mail who does not know the state of the user, the current state of the user is explained in the automatic reply message, so that the sender of the mail can know the current state of the user fast after sending the mail, that is, the sender of the mail can obtain a fast response. Moreover, the user can set different automatic reply messages for different types of mail senders, so that the user obtain convenient, flexible, and personalized automatic reply setting experience.

Through the above description of the implementation, it is clear to persons skilled in the art that the present invention may be accomplished through hardware, or through software plus a necessary universal hardware platform. Based on this, all or a part of the embodiments of the present invention can be embodied in the form of a software product. The computer software product may be stored in a computer storage medium such as such as a read-only memory (ROM), a random-access memory (RAM), a magnetic disk, and an optical disk, and contain several instructions to instruct a computer equipment (for example, a personal computer, a server, or a network equipment) to execute the method described in the embodiments of the present invention.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, and such modifications or replacements do not depart from the spirit and protection scope of the present invention.

What is claimed is:

1. A method for automatically replying to mail, comprising:
   setting a mail automatic reply time interval;
   receiving a new mail sent to a user;
   obtaining presence information of the user;
   searching for a mail automatic reply message corresponding to the presence information of the user;
   determining whether the presence information indicates that a presence state of the user has changed during the mail automatic reply time interval; and
   sending the corresponding mail automatic reply message to a sender of the mail when it is determined that the presence state of the user has changed during the mail automatic reply time interval, and wherein the corresponding mail automatic reply message corresponds to a current presence state of the user, wherein sending the corresponding mail automatic reply message comprises determining whether a subsequent mail from the same sender of the mail is received after receiving the new mail and before the mail automatic reply time interval of the new mail is reached, and determining whether the presence information of the user changes when receiving the subsequent mail, and wherein the subsequent mail is automatically replied to and the automatic reply to the new mail is cancelled when it is determined that the presence information of the user has changed when the subsequent mail is received.

2. The method according to claim 1, further comprising setting automatic reply messages respectively for different presence information of the user.

3. The method according to claim 1, further comprising obtaining automatic reply messages respectively corresponding to different presence information of the user.

4. The method according to claim 1, wherein the corresponding mail automatic reply message is sent to the sender of the mail without a delay when an automatic reply has not been sent to the sender of the mail during the mail automatic reply time interval before the mail is received.

5. The method according to claim 1, wherein the new mail is automatically replied to when the mail automatic reply time interval of the new mail is reached and the presence information of the user has not changed when the subsequent mail is received.

6. The method according to claim 1, further comprising:
   determining whether the user is online according to the presence information of the user; and
   stopping the corresponding mail automatic reply message from being sent to the sender of the mail when the user is online.

7. The method according to claim 2, wherein setting the mail automatic reply messages respectively for the different presence information of the user comprises:
   adding a test command indicating the presence information;
   setting different values for the test command to correspond to the different presence information; and
   adding an action command indicating automatic reply, wherein contents content of the action command comprise the mail automatic reply messages.

8. The method according to claim 1, further comprising:
   setting mail automatic reply messages for different mail information key words;
   searching for mail automatic reply messages corresponding to the presence information of the user and for mail automatic reply messages corresponding to the mail information key words; and
   sending the mail automatic reply message satisfying the presence information and the mail information key words to the sender of the mail.

9. An apparatus for automatically replying to mail, comprising:
   an automatic reply setting unit configured to set a mail automatic reply time interval;
   a mail receiving unit configured to receive a new mail sent to a user;
   a presence information obtaining unit configured to obtain presence information of the user;
   an automatic reply message matching unit configured to search for an automatic reply message corresponding to the presence information of the user; and
   an automatic reply message sending unit configured to send the corresponding mail automatic reply message to a sender of the mail according to the mail automatic reply time interval,
   wherein the automatic reply message sending unit comprises a presence comparison unit and an automatic reply executing unit,
   wherein the presence comparison unit is configured to compare a current presence state of the user with a presence state of the user during a previous automatic reply, and
   wherein the automatic reply executing unit is configured to send an automatic reply that corresponds to the current presence state of the user to the sender of the mail when a comparison by the presence comparison unit indicates that the presence information of the user changes during the mail automatic reply time interval,
   wherein the automatic reply setting unit is further configured to set mail automatic reply messages respectively for different presence information of the user;
   wherein the automatic reply message sending unit further comprises a subsequent mail checking unit configured to determine whether a subsequent mail from the same sender of the mail is received after a new mail is received and before automatic reply time interval of the new mail is reached,
   wherein the presence information comparison unit is further configured to determine whether the presence information of the user changes when the subsequent mail is received, and
   wherein the automatic reply executing unit is further configured to automatically reply to the subsequent mail and cancel the automatic reply to the new mail if the presence information changes when the subsequent mail is received, and automatically reply to the new mail when the automatic reply time interval of the new mail is reached if the presence information does not change.

10. The method according to claim 1, wherein setting the mail automatic reply time interval comprises setting an amount of time included in the mail automatic reply time interval, and wherein determining whether the presence information indicates that the presence state of the user has changed comprises determining whether the presence state of the user has changed between a present time when the user receives the new mail and a previous time that is separated from the present time by the amount of time included in the mail automatic reply time interval.

11. The apparatus according to claim 9, wherein the automatic reply setting unit is configured to set an amount of time included in the mail automatic reply time interval, and wherein the presence comparison unit is configured to determine whether the presence state of the user has changed between a present time when the user receives the new mail and a previous time that is separated from the present time by the amount of time included in the mail automatic reply time interval.

* * * * *

UNITED STATES PATENT AND TRADEMARK OFFICE
CERTIFICATE OF CORRECTION

PATENT NO. : 8,499,050 B2  
APPLICATION NO. : 13/170749  
DATED : July 30, 2013  
INVENTOR(S) : George Robins Page 1 of 1

It is certified that error appears in the above-identified patent and that said Letters Patent is hereby corrected as shown below:

On the Title Page

Item (74) should read as follows:

(74) Attorney, Agent, or Firm - Conley Rose, P.C.; Grant Rodolph; Nicholas K. Beaulieu Signed and Sealed this
First Day of October, 2013

Teresa Stanek Rea
*Deputy Director of the United States Patent and Trademark Office*

UNITED STATES PATENT AND TRADEMARK OFFICE
CERTIFICATE OF CORRECTION

PATENT NO.       : 8,499,050 B2                                    Page 1 of 1
APPLICATION NO.  : 13/170749
DATED            : July 30, 2013
INVENTOR(S)      : Robins George It is certified that error appears in the above-identified patent and that said Letters Patent is hereby corrected as shown below:

On the Title Page

Item (12) should read as follows:

(12) George

Item (75) should read as follows:

(75) Inventor: Robins George

Signed and Sealed this
Tenth Day of December, 2013

Margaret A. Focarino
*Commissioner for Patents of the United States Patent and Trademark Office*